United States Patent [19]
Wahlig

[11] 3,809,229
[45] May 7, 1974

[54] PROPHYLATIC ENCLOSURE FOR CLINICAL THERMOMETERS DURING USE

[76] Inventor: James William Wahlig, 195-17 Station Rd., Flushing, N.Y. 11358

[22] Filed: May 6, 1971

[21] Appl. No.: 140,797

[52] U.S. Cl. ............................ 206/306, 73/371
[51] Int. Cl. ................... G01k 1/08, B65d 85/20
[58] Field of Search ........ 73/362 AR, 371; 206/16.5

[56] References Cited
UNITED STATES PATENTS

| | | | |
|---|---|---|---|
| 1,119,202 | 12/1914 | Talbot | 206/16.5 |
| 3,703,892 | 12/1970 | Meyers | 206/16.5 UX |
| 2,753,714 | 7/1956 | Perkins et al. | 73/362 AR |
| 3,469,449 | 9/1969 | Keller | 73/362 AR |
| 3,593,581 | 7/1971 | Beightol | 73/362 AR |
| 2,915,175 | 12/1959 | Diamant | 206/16.5 |
| 2,938,385 | 5/1960 | Mack et al. | 73/362 AR |
| 3,254,533 | 6/1966 | Tongret | 73/362 AR |
| 3,650,153 | 3/1972 | Schwab | 73/362 AR X |

*Primary Examiner*—Richard C. Queisser
*Assistant Examiner*—Frederick Shoon
*Attorney, Agent, or Firm*—Brumbaugh, Graves, Donohue & Raymond

[57] ABSTRACT

An enclosure within which an elongated medical thermometer is to be placed prior to insertion into the body orifice of the subject whose temperature is to be taken. The enclosure may be secured to the thermometer at its heat sensitive portion. This enclosure will enable attainment of a level of asepsis presently obtainable only by discard of the thermometer itself after one-time use.

1 Claim, 2 Drawing Figures

PATENTED MAY 7 1974　　　　　　　　　　　　　　　　3,809,229

PROPHYLATIC ENCLOSURE FOR CLINICAL THERMOMETERS DURING USE

This invention consists of an enclosure to receive a medical thermometer prior to use and from which it is to be removed after use. After each use the enclosure is to be discarded if of the type (throw-away), so intended, or stored for sterilization if of the type (re-use), so intended. Since either type will provide optimum sanitary conditions during the use of medical thermometers, this invention will tend to reduce greatly the hazards of transferring infection from subject to subject.

This enclosure will possess the necessary heat conducting properties and when intended for sterilization and re-use, the necessary heat resistance and other properies to withstand sterilization procedures.

The object of this invention is to provide optimum asepsis for use of medical thermometers. These thermometers are not able to withstand the elevated temperatures requisite to accepted first level sterilizing procedures, (boiling) or the even higher temperatures of preferred sterilization, (autoclave). This defect in conventional thermometers is an ever present hazard and even deterrent to their use.

This invention will achieve the desired objective by interposing what amounts to being a removable, replaceable outer layer to the thermometer. This layer largely eliminates from consideration the deficiencies previously cited. Additional advantages will derive from the fact that the invention is suitable to two principal modes of construction. One mode is is for the enclosure to be constructed of materials sufficiently durable to withstand approved sterilization techniques. This mode being intended for re-use. The second mode is for the enclosure to be manufactured in such manner and so packaged that the necessary asepsis is maintained until first use only. This mode is intended for discard after first use ("throw-away").

The nature of this invention is such that a profusion of techniques, configurations materials and modifications are suitable and felicitous to its construction.

For example, in both modes that portion of the enclosure surrounding the scale portion of the thermometer could be transparent, enabling reading before removal; on the other hand if this portion were opaque, necessitating removal before reading the difference in utility would be negligible and thus such choice would be purely that-choice. Further, the enclosure can be so made to receive a variety of either caps or self-closures. Presence or absence of closure is not essential to its objective, even though a closure might afford some slight additional advantage.

These and other advantages of this invention will be apparent when reference is made to the accompanying drawings and the following description:

FIG. 1 is a side view of a clinical thermometer arranged according to the present invention; and FIG. 2 is a side view, partly broken away, of a protective enclosure arranged according to the present invention with the FIG. 1 clinical thermometer contained therein.

DESCRIPTION OF PREFERRED EMBODIMENT

Figure 1:
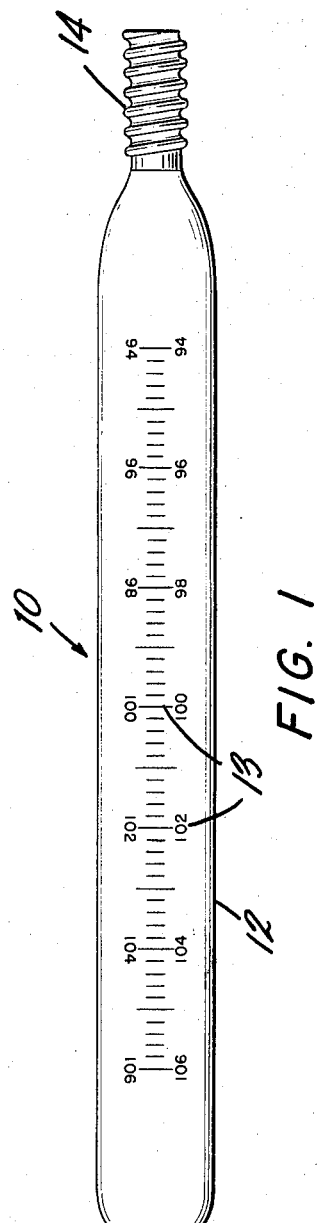
Figure 2:
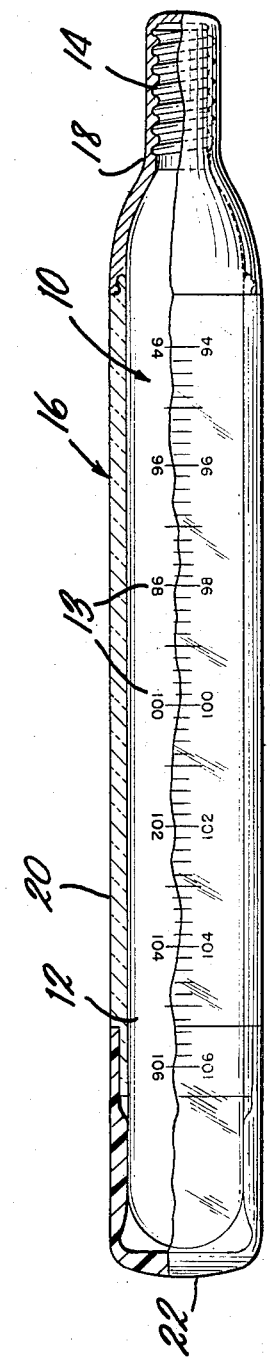

In the illustrative embodiment of the present invention shown in FIGS. 1 and 2, an elongate clinical thermometer 10 comprises a glass stem 12 having temperature indicating graduations 13 etched thereon and a helically threaded bulb 14. As is understood in the art, a liquid, such as mercury, is used in the thermometer 10. When the temperature of the thermometer increases, the differential expansion between the glass and the liquid causes the liquid to rise in the thermometer.

In accordance with the present invention, there is provided a prophylactic enclosure or sleeve 16 adapted to receive the clinical thermometer 10. The sleeve 16 comprises a first section 18 formed of heat conducting material, which may be, for example, metal, with an internal complementary thread for engaging the threaded bulb of the thermometer 10. Extending from the first section of the sleeve is an open-ended main body portion 20 which corresponds generally in shape to that of thermometer stem 12. The main body portion 20 may be constructed of heat resistant glass, such as the glass sold under the registered trademark "Pyrex."

A removable cap member 22 formed, for example, of a plastic material, frictionally engages the open end of the main body portion 20.

In use, the cap member 22 is removed from the body portion 20 to permit insertion of the thermometer 10 into the enclosure 16. The thermometer is then locked in place by threadedly engaging the bulb 14 and the heat conductive first section 18 of the enclosure 16, and the cap 22 secured to the enclosure. The enclosure is now ready for use by the patient.

In use, only the enclosure 16 will become contaminated and, depending on the construction of the main body portion 20 of the enclosure, the patient's temperature may be read directly from the thermometer through the enclosure.

Transfer of infection or any contamination from one thermometer subject to another will be largely precluded because of the throw-away feature in that mode, or the enhanced sterilization feature of the re-usable mode.

The foregoing is illustrative of the principles, applications, and representative embodiments of the invention. Since numerous modifications and changes will occur to those sufficiently skilled in the arts, it is neither intended nor desired to limit the invention to the exact construction shown and described. Accordingly all suitable modifications and equivalents resorted to fall within the scope of the invention as claimed.

What is claimed as new is as follows:

1. A prophylactic enclosure for an elongate clinical thermometer, the heat sensitive portion of said thermometer being helically threaded at one end thereof, said enclosure adapted to fit over said thermometer, and having a heat conductive portion with an internal complementary thread adapted to engage the threaded, heat-sensitive portion of the thermometer.

* * * * *